(12) United States Patent
Anderson et al.

(10) Patent No.: US 6,600,591 B2
(45) Date of Patent: Jul. 29, 2003

(54) MICROMIRROR ARRAY HAVING ADJUSTABLE MIRROR ANGLES

(75) Inventors: Robert Anderson, Boulder, CO (US); Bevan Staple, Longmont, CO (US); Richard Roth, Boulder, CO (US)

(73) Assignee: Network Photonics, Inc., Boulder, CO (US)

( * ) Notice: Subject to any disclaimer, the term of this patent is extended or adjusted under 35 U.S.C. 154(b) by 174 days.

(21) Appl. No.: 09/880,230

(22) Filed: Jun. 12, 2001

(65) Prior Publication Data

US 2002/0186449 A1 Dec. 12, 2002

(51) Int. Cl.⁷ .................. G02B 26/00; G02B 6/26; G09G 3/34
(52) U.S. Cl. .................. 359/291; 359/223; 359/295; 359/298; 345/108; 345/85; 385/18; 385/14
(58) Field of Search .................. 345/108, 85, 110; 385/14–18; 359/290, 291, 295, 298, 223, 224

(56) References Cited

U.S. PATENT DOCUMENTS

| | | | |
|---|---|---|---|
| 5,414,540 A | 5/1995 | Patel et al. | 359/39 |
| 5,677,703 A | * 10/1997 | Bhuva et al. | 345/84 |
| 5,768,007 A | * 6/1998 | Knipe et al. | 359/290 |
| 5,917,625 A | 6/1999 | Ogusu et al. | 359/130 |
| 5,960,133 A | 9/1999 | Tomlinson | 385/18 |
| 5,998,906 A | * 12/1999 | Jerman et al. | 310/309 |
| 5,999,672 A | 12/1999 | Hunter et al. | 385/37 |
| 6,028,689 A | 2/2000 | Michalicek et al. | 385/18 |
| 6,040,935 A | 3/2000 | Michalicek | 359/198 |
| 6,046,840 A | * 4/2000 | Huibers | 359/291 |
| 6,097,519 A | 8/2000 | Ford et al. | 359/130 |
| 6,097,859 A | 8/2000 | Solgaard et al. | 385/17 |
| 6,108,471 A | 8/2000 | Zhang et al. | 385/37 |
| 6,128,122 A | 10/2000 | Drake et al. | 359/224 |
| 6,307,657 B1 | 10/2001 | Ford | 359/130 |
| 6,323,834 B1 | * 11/2001 | Colgan et al. | 345/85 |

(List continued on next page.)

OTHER PUBLICATIONS

Rallison, R.D., "Dense Wavelength Division Multiplexing (DWDM) and the Dickson Grating," White Paper, Jan. 6, 2001.

Ford et al., "Wavelength Add–Drop Switching Using Tilting Micromirrors," Journal of Lightwave Technology, vol. 17, No. 5, May 1999, pp. 904–911.

Grade et al., "A Large–Deflection Electrostatic Actuator for Optical Switching Applications," Solid State Sensor and Actuator Workshop, Hilton Head, SC, Jun. 4–8, 2000, pp. 97–100.

Nishi et al., "Broad–Passband–Width Optical Filter for Multi/Demultiplexer Using a Diffraction Grating and a Retroreflector Prism," Electronics Letters, May 9$^{th}$ 1985, vol. 21, No. 10, pp. 423–424.

Phillipe, et al., "Wavelength demultiplexer: using echelette gratings on silicon substrate," Applied Optics, vol. 24, No. 7, Apr. 1985, pp. 1006–1011.

Sun et al., "Demultiplexer with 120 Channels and 0.29–nm Channel Spacing," IEEE Photonics Technology Letters, vol. 10, No. 1, Jan. 1998, pp. 90–92.

*Primary Examiner*—Evelyn Lester
(74) *Attorney, Agent, or Firm*—Townsend and Townsend and Crew LLP (57) ABSTRACT

A method and system are provided for operating an array of such optical micromirrors. Electrodes associated with each of a plurality of optical micromirrors within the array are sequentially actuated by applying a voltage to each such electrode for a fixed time. The voltage applied to each of the electrodes is selected so that the optical micromirror with which that electrode is associated is positioned in a certain tilted position. The step of sequentially actuating electrodes is repeated to maintain the tilted positions of the plurality of optical micromirrors.

35 Claims, 10 Drawing Sheets

U.S. PATENT DOCUMENTS

| | | | |
|---|---|---|---|
| 6,469,677 B1 * | 10/2002 | Schaffner et al. | 343/876 |
| 6,473,361 B1 * | 10/2002 | Chen et al. | 365/244 |
| 6,485,273 B1 * | 11/2002 | Goodwin-Johansson | 417/410.2 |
| 6,501,877 B1 | 12/2002 | Weverka | |
| 6,535,319 B2 * | 3/2003 | Buzzetta et al. | 385/18 |
| 2003/0011863 A1 * | 1/2003 | Muller | 359/224 |
| 2003/0012488 A1 * | 1/2003 | Staple et al. | 385/18 |

* cited by examiner

MICROMIRROR ARRAY HAVING ADJUSTABLE MIRROR ANGLES

BACKGROUND OF THE INVENTION

This application relates generally to microelectromechanical systems, and more particularly to MEMS devices and methods for use in micromirror arrays.

In recent years, increasing emphasis has been made on the development of techniques for producing microscopic systems that may be tailored to have specifically desired electrical and/or mechanical properties. Such systems are generically described as microelectromechanical systems (MEMS) and are desirable because they may be constructed with considerable versatility despite their very small size. In a variety of applications, MEMS component structures may be fabricated to move in such a fashion that there is a risk of stiction between that component structure and some other aspect of the system. One such example of a MEMS component structure is a micromirror, which is generally configured to reflect light from at least two positions. Such micromirrors find numerous applications, including as parts of optical switches, display devices, and signal modulators, among others.

In many applications, such as may be used in fiber-optics applications, such MEMS-based devices may include hundreds or even thousands of micromirrors arranged as an array. Within such an array, each of the micromirrors should be accurately aligned with both a target and a source. Such alignment is generally complex and typically involves fixing the location of the MEMS device relative to a number of sources and targets. If any of the micromirrors is not positioned correctly in the alignment process and/or the MEMS device is moved from the aligned position, the MEMS device will not function properly.

Figure 1A:
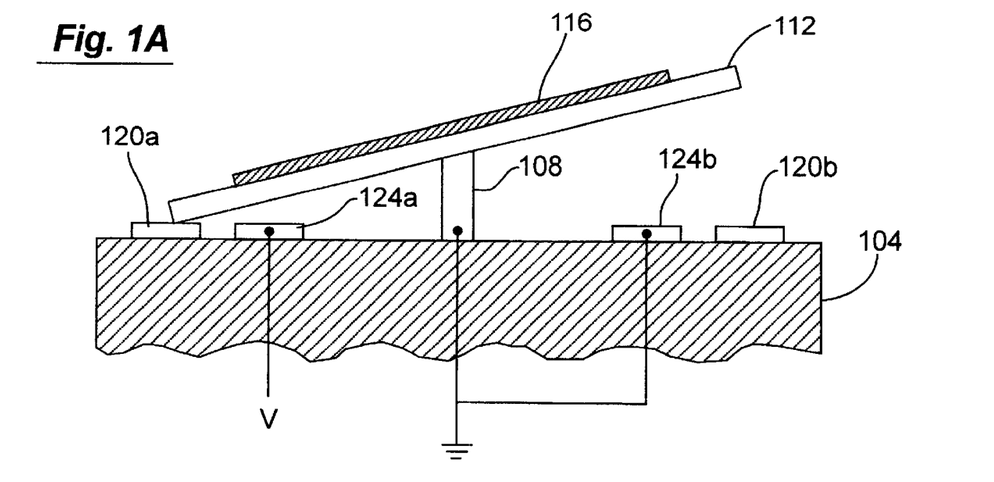
FIGS. 1A, 1B, and 1C are cross-sectional drawings of one embodiment of a tilting micromirror in three positions effected by actuation of different actuators.
Figure 1B:
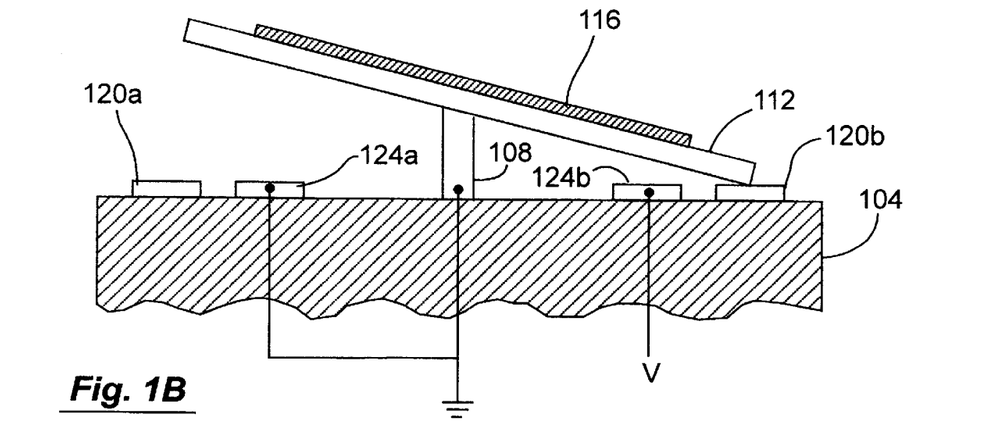
Figure 1C:
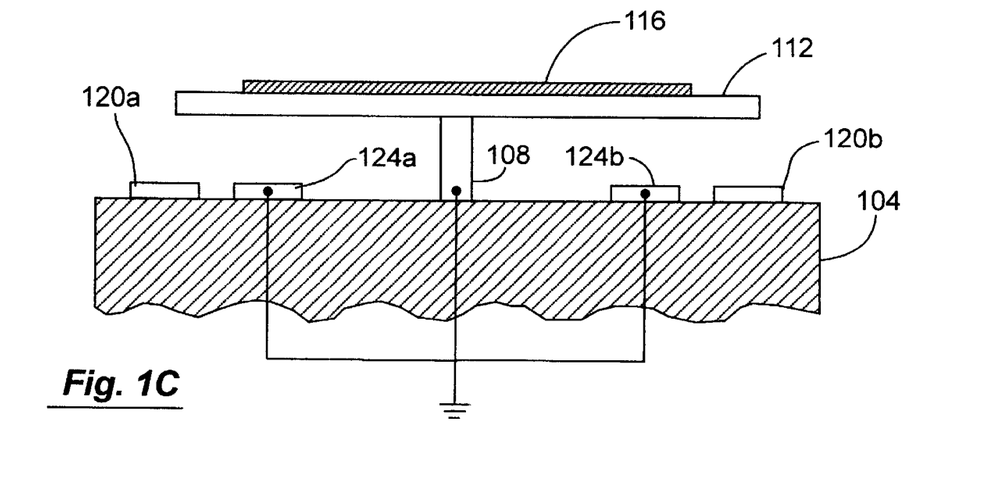

In part to reduce the complexity of alignment, some MEMS devices provide for individual movement of each of the micromirrors. An example is provided in FIGS. 1A–1C illustrating a particular MEMS micromirror structure that may take three positions. Each micromirror includes a reflective surface 116 mounted on a micromirror structural film 112 that is connected by a structural linkage 108 to an underlying substrate 104. Movement of an individual micromirror is controlled by energizing actuators 124*a* and/or 124*b* disposed underneath the micromirror on opposite sides of the structural linkage 108. Hard stops 120*a* and 120*b* are provided to stop the action of the micromirror structural film 112. Energizing the actuator 124*a* on the left side of the structural linkage 108 causes the micromirror to tilt on the structural linkage 108 towards that side until one edge of the micromirror structural film 112 contacts the left hard stop 120*a*, as shown in FIG. 1A. Alternatively, the actuator 124*b* on the right side of the structural linkage 108 may be energized to cause the micromirror to tilt in the opposite direction, as shown in FIG. 1B. When both actuators are de-energized, as shown in FIG. 1C, the micromirror returns to a static position horizontal to the structural linkage 108. In this way, the micromirror may be moved to any of three positions. This ability to move the micromirror provides a degree of flexibility useful in aligning the MEMS device, although the alignment complexity remains significant. Sometimes hard stops 120*a* and 120*b* are not provided so that the micromirror structural film 112 is in direct contact with the substrate 104.

Even in such configurations, however, the angle of the micromirror in a tilted position is fixed. Processes for fabrication of MEMS structures are such that this tilt angle may not be ideal for a given application. Even relatively small deviations from the preferred tilt angle, when present for numerous micromirrors in an array, may result in performance for a system that is less than ideal. Moreover, in some such applications, the micromirror may remain in a given tilted position for ten years or more. Thus, for example, one side of an individual micromirror structural film may remain in contact with the hard stop or substrate for extended periods. Maintaining such contact increases the incidence of dormancy-related stiction. Such stiction results in the micromirror remaining in a tilted position even after the actuators are de-energized. Some theorize that stiction is a result of molecule and/or charge build up at the junction between the micromirror structural film and the hard stop or substrate. For example, it has been demonstrated that an accumulation of $H_2O$ molecules at the junction produces capillary forces that increase the incidence of stiction.

Some solutions exist for overcoming stiction, such as by packaging the MEMS device in a hermetic environment to reduce molecular accumulation at the junction or by periodically vibrating the device, such as described in Ville Kaajakari, "Ultrasonic Actuation for MEMS Dormancy-Related Stiction Reduction", Proceedings of SPIE Vol. 4180 (2000), which is herein incorporated by reference for all purposes. Such techniques, however, do not address the fact that the tilt angles for the micromirrors are fixed. Moreover, stiction remains a concern is such solutions; it would be preferable to use a method for dynamically selecting individual angles for each mirror in an array without the micromirror structural film ever contacting a hard stop or substrate.

SUMMARY OF THE INVENTION

Embodiments of the invention are thus directed to a method and system that permits individual tilt angles to be selected for optical micromirrors within an array. Each optical micromirror in the array includes a structural film connected with a substrate by a structural linkage. At least one electrode is configured to tilt the structural film upon application of a voltage.

In one embodiment, a method is provided for operating an array of such optical micromirrors. Electrodes associated with each of a plurality of optical micromirrors within the array are sequentially actuated by applying a voltage to each such electrode for a fixed time. The voltage applied to each of the electrodes is selected so that the optical micromirror with which that electrode is associated is positioned in a certain tilted position. The step of sequentially actuating electrodes is repeated to maintain the tilted positions of the plurality of optical micromirrors. In one embodiment, the voltage selected for each of the electrodes is less than a snap-in voltage for its associated optical micromirror. One of the plurality of optical micromirrors may comprise a torsion-beam micromirror. Alternatively, one of the plurality of optical micromirrors may comprise a cantilever micromirror. The voltage applied to each of the electrodes may differ, as may the fixed time for which the voltage is applied. These voltages and/or fixed times may be retrieved from a memory and may be changed as necessary or desirable, such as in response to external conditions. One of the micromirrors may be switched to a new tilted position by changing the applied voltage or may be switched by resonantly driving the associated electrode.

In another embodiment, at least one of the plurality of optical micromirrors uses a comb-drive linear-actuation configuration. In such a configuration, a first actuator linkage is connected with the structural film on a first side of the structural linkage and connected with a first linear actuator on a second side of the structural linkage. Similarly, a second actuator linkage is connected with the structural film on the second side of the structural linkage and connected with a second linear actuator on the first side of the structural linkage. A first electrode is configured, such as with a comb drive, to move the first linear actuator upon actuation and a second electrode is similarly configured to move the second linear actuator upon actuation.

Such embodiments for a method of the invention may be realized with a system that includes a multichannel driver and a controller. In one embodiment, the multichannel driver has a plurality of lines in communication with the electrodes associated with the plurality of optical micromirrors. It is configured to apply a voltage through such lines to the electrodes. The controller is configured to control the multichannel driver to maintain the plurality of optical micromirrors in a set of certain tilted positions. This is done by sequentially actuating the electrodes by applying the voltage for each electrode for the fixed time. Where such voltages and/or fixed times are retrieved from a memory, the system may also comprise a memory in communication with the controller. In one embodiment, the memory is a digital memory and the system further comprises a digital-analog converter.

In some embodiments, the array of optical micromirrors is part of a wavelength router for directing a plurality of spectral bands to a plurality of output ports. In such embodiments, the tilted positions of the plurality of optical micromirrors may approximately equalize the intensity of the plurality of spectral bands at the plurality of output ports.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Embodiments of the invention are directed to MEMS methods and devices in which a microstructure is held in an adjustable stable position without contacting either a substrate or hard stop. In certain embodiments, the microstructure is a micromirror that may be rotated to such an adjustable stable position. Because of the ready applicability of such an adjustable contactless micromirror to optical-switch applications, some of the embodiments are directed to a wavelength router that uses optical switching. Since there is no direct contact with the microstructure, stiction is thereby avoided. Additionally, in some embodiments, the adjustability of a plurality of such micromirrors in an array is used to optimize performance of the array for certain applications. As will be clear to those of skill in the art from the following description, the invention may be adapted to different types of micromirror configurations, including cantilever micromirrors and torsion-beam micromirrors.

It is noted that throughout herein micromirror configurations are shown schematically in the figures for illustrative purposes. As will be understood by those of skill in the art, the point of rotation of the micromirror structural film should be selected so that in the desired static micromirror configurations both the forces on the structural film and the torques about the point of rotation cancel.

2. Adjustable-Angle Microstructures

Embodiments of the invention make use micromirror configurations in which the tilt angle for the micromirror structural film is adjustable. At least two configurations that provide adjustable angles are described below, although other configurations will be known or will occur to those of skill in the art upon reading such disclosure. As is evident from the descriptions below, another feature of these configurations is that the micromirror structural film never contacts the substrate or a hard stop so that stiction problems are avoided.

a. "Short-Mirror" Microstructures

Figure 1D:
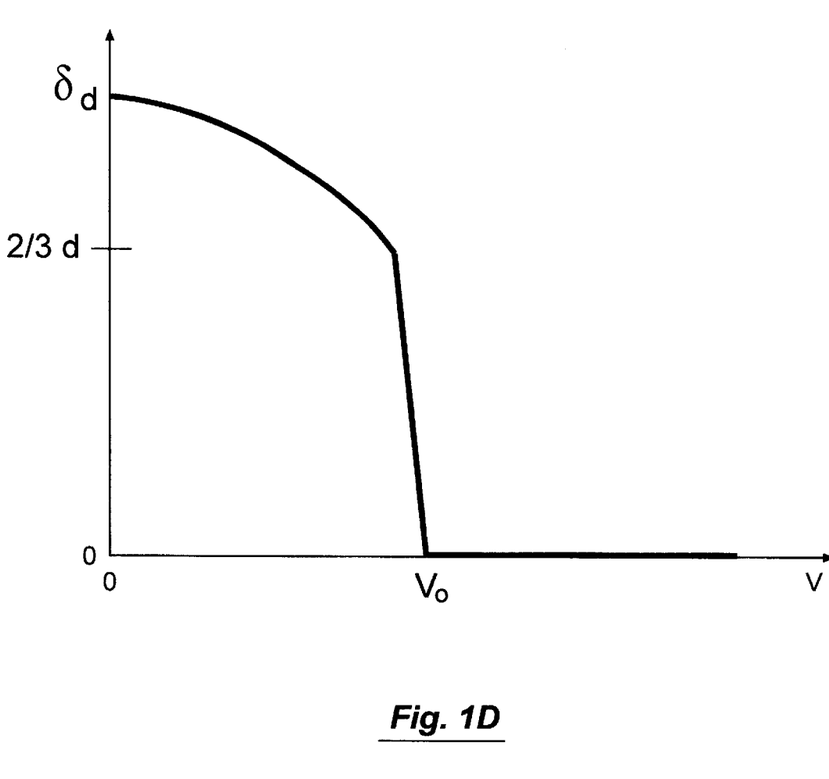
FIG. 1D is a graphical illustration of the behavior of the separation between a micromirror structural film and substrate for a micromirror arrangement as a function of increasing electrode voltage using the embodiment shown in FIGS. 1A–1C.

In a first adjustable-angle configuration, each micromirror is configured as shown in FIGS. 1A–1C, perhaps without the hard stops 120a and 120b. In FIG. 1D is shown graphically the dependence of the separation $\delta$ between the micromirror structural film 112 and the substrate 104 on the side of the structural linkage 108 where a potential is applied to actuator 124a or 124b. Upon application of a voltage V, the separation decreases from its rest value $\delta = d$, the attractive force between the structural film 112 and the electrode being proportional to $1/\delta^2$. After application of a sufficient voltage $V_0$ ("the snap-in voltage") to cover one third of the rest gap d, the structural film is snapped into position. After the micromirror has been snapped into position, further changes in voltage have no effect on its position.

Thus, in the "short-mirror" configuration, the voltage V applied to the electrode is always less than $V_0$ so that the micromirror is never snapped into the positions shown in FIGS. 1A and 1B. Instead, a particular voltage ($<V_0$) is used to maintain the micromirror at a position intermediate between that shown in FIG. 1C and one of FIGS. 1A and 1B. In tests performed by the inventors, it has been noted that once a micromirror has been positioned at a certain angle by application of a particular voltage, deactuation of the electrode does not result in immediate degradation of the micromirror position. Instead, because of the relatively high impedance of the system, the electrostatic potential difference persists for hundreds, or even thousands, of milliseconds before discharge. This feature is used below because it means that the micromirror is unaffected by removing the voltage for short periods of time, on the order of less than 1 second.

Figure 2A:
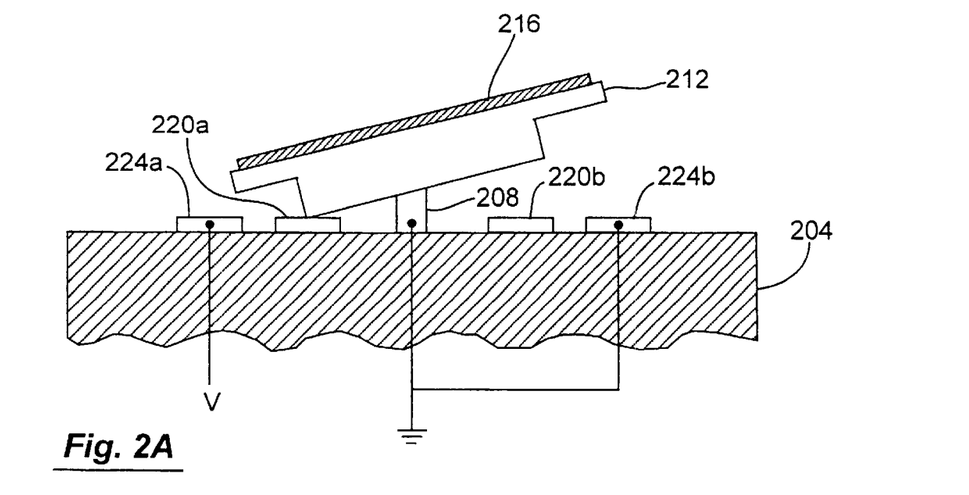
FIGS. 2A, 2B, and 2C are cross-sectional drawings of another embodiment of a tilting micromirror in three positions effectuated by actuation of different actuators.
Figure 2B:
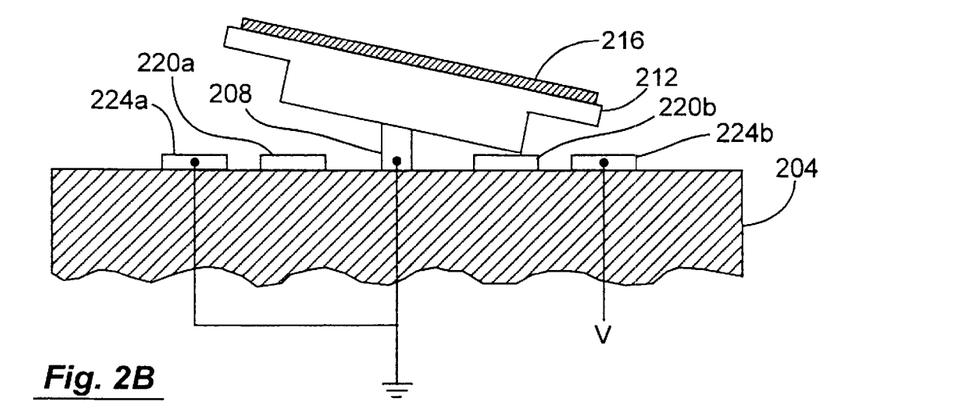
Figure 2C:
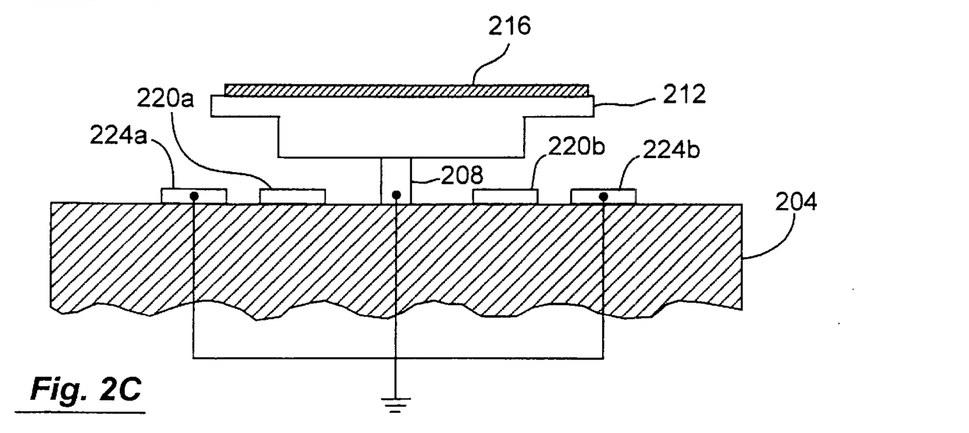

A variation is shown in FIGS. 2A–2D, which illustrate another embodiment for the "short-mirror" microstructures. In this adjustable-angle configuration, each micromirror is configured as shown in FIGS. 2A–2C. A pair of hard stops 220a and 220b and a pair of actuators 224a and 224b are formed on the substrate 204. The micromirror structural film 212 is supported above the substrate 204 by a structural linkage 208, with the micromirror 216 formed on the micromirror structural film 212. In this embodiment, however, the hard stops 220a and 220b are formed closer to the structural linkage 208 than are the actuators 224a and 224b. The structural film 212 is formed with a centrally thick portion that comes into contact with one of the hard stops before the snap-in voltage is reached. Thus, application of a voltage respectively to either the left actuator 224a or to the right actuator 224b results in a tilt of the micromirror to the left or right as shown in FIGS. 2A and 2B. The rest position of the micromirror is shown in FIG. 2C.

Figure 2D:
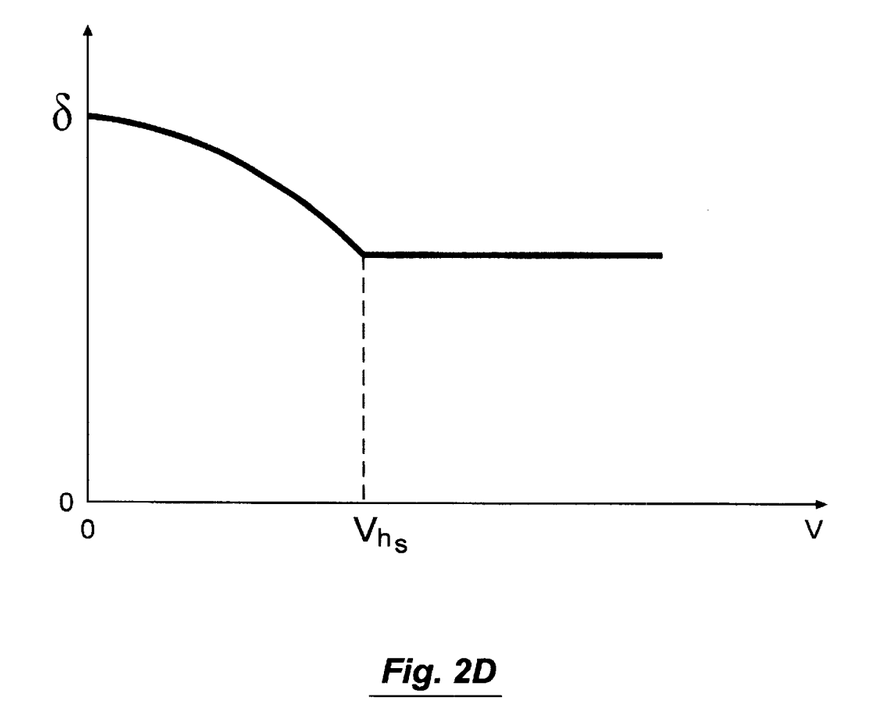
FIG. 2D is a graphical illustration of the behavior of the separation between a micromirror structural film and substrate for a micromirror arrangement as a function of increasing electrode voltage using the embodiment shown in FIGS. 2A–2C.

The separation δ between the micromirror structural film 212 and the substrate 204 is shown for this embodiment in FIG. 2D. The behavior of δ is the same as for the embodiment shown in FIGS. 1A–1C up until the voltage $V_{hs}$ that causes contact with one of the hard stops 220a or 220b. Unlike the embodiment of FIGS. 1A–1C, δ (and hence the mirror angle) remains stable as the voltage is further increased. This embodiment thus has no "snap-in" and permits the structural film 212 to be considerably shortened.

b. "Comb-Drive " Microstructures

Figure 3:
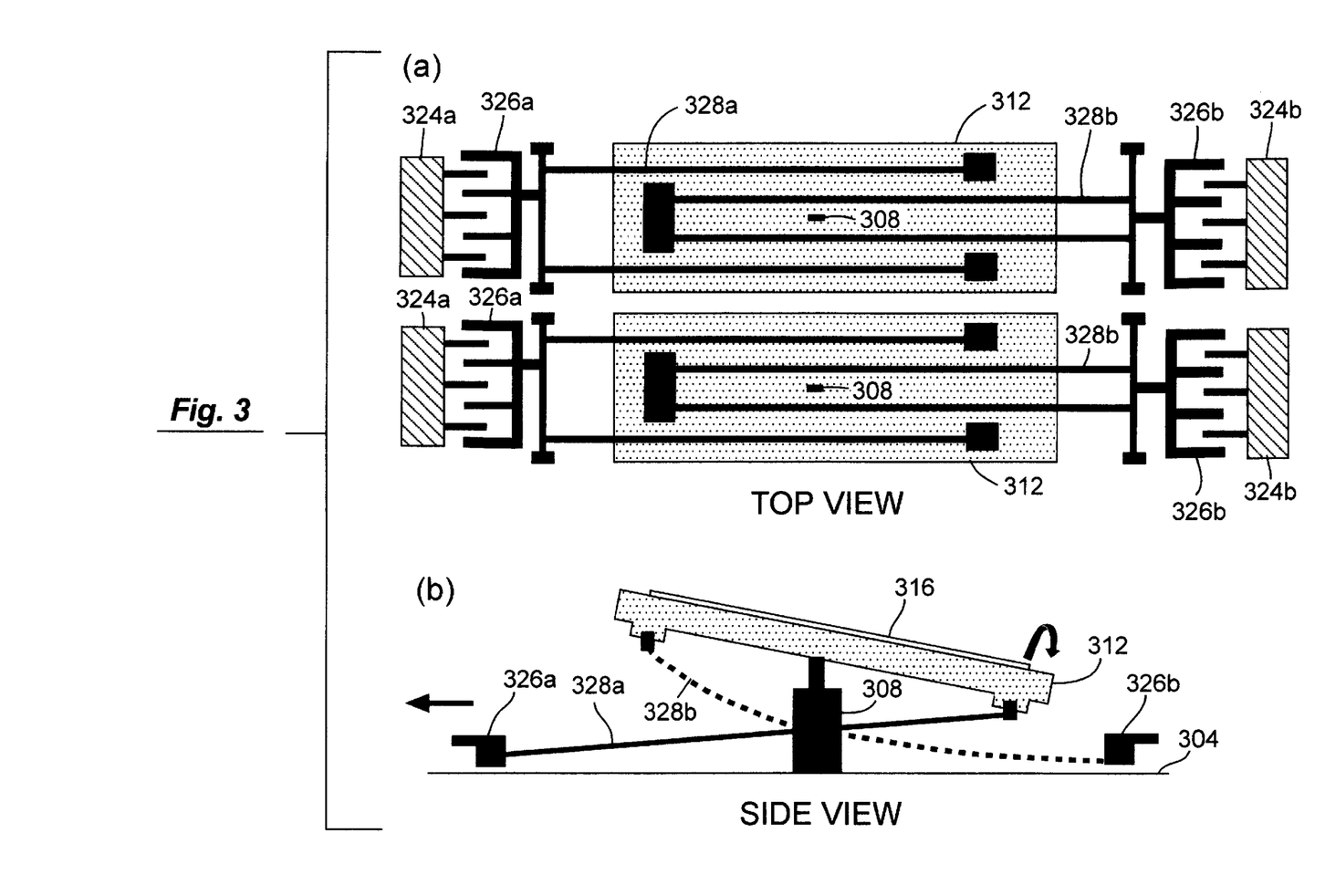
FIG. 3 illustrates one embodiment in which a micromirror is provided with adjustable angles.

FIG. 3 illustrates an alternative configuration in which a comb drive is used with a linear actuator to achieve adjustable tilt angles. Part (a) of the figure shows a top view with two micromirrors of an array and part (b) of the figure shows a side view. The basic structure of the micromirror is the same as in FIG. 1: a reflective surface 316 is formed on a micromirror structural film 312, which is connected with a substrate 304 by a structural linkage 308. The tilting of the micromirror is achieved by an electromechanical arrangement. Each end of the structural film 312 is connected with a linear actuator 326 on the opposite side of the structural linkage 308 by an actuator linkage 328: in the view shown, the left side of the structural film 312 is connected with a right linear actuator 326b by actuator linkage 328b and the right side of the structural film is connected with a left linear actuator 326a by actuator linkage 328a.

The linear actuators 326a and 326b are each formed as comb structures interdigitated with electrodes 324a and 324b. Upon application of a voltage at one of the electrodes 324a or 324b, the respective linear actuator 326a or 326b moves towards the electrode and causes the micromirror structural film 312 to tilt. In the configuration shown in FIG. 3(b), the left electrode 324a is active so that linear actuator 326 has moved to the left and caused the micromirror to be tilted to the right. The degree of tilt is controlled by the strength of the voltage applied to the electrode so that each mirror in an array may have a different tilt by applying voltages to the electrodes differently. As for the previous configuration, the tilt position of the micromirror is relatively stable once it has been achieved. Even after deactuation of the electrode, the position is held for a time on the order of hundreds or thousands of seconds. As is also evident, this configuration avoids stiction problems because the micromirror structural film 312 never needs to contact the substrate 304 or a hard stop.

3. System for Individual Addressing of Electrodes in a Micromirror Array

In the torsion-beam-type configurations described above for micromirrors having adjustable mirror angles, two electrodes are provided to define the position of each micromirror. Thus, in order to provide an array of N micromirrors in which the tilt angle of each micromirror is set individually, it is necessary to address the voltage to be applied to 2N electrodes. If the array includes on the order of N~100 micromirrors, the cost would for providing approximately 200 analog drivers for individually addressing the electrodes would be prohibitive. In similar configurations that use cantilever-type micromirror arrangements, a single electrode may be used for each mirror, but the cost of including individual drivers is still prohibitive.

Accordingly, embodiments of the invention use an arrangement that exploits the slow discharge response of the electrodes. A cyclic procedure is used in which the desired voltage for each electrode is applied for a short period of time, typically less than 1 ms, with a voltage being applied to each electrode sequentially throughout the entire array. For an array with N~100, this results in every electrode having a voltage applied to it at least several times every second. The micromirror states are thus held without contact that may lead to stiction concerns, and with the added advantage that the tilt of each micromirror may be defined individually.

Figure 4:
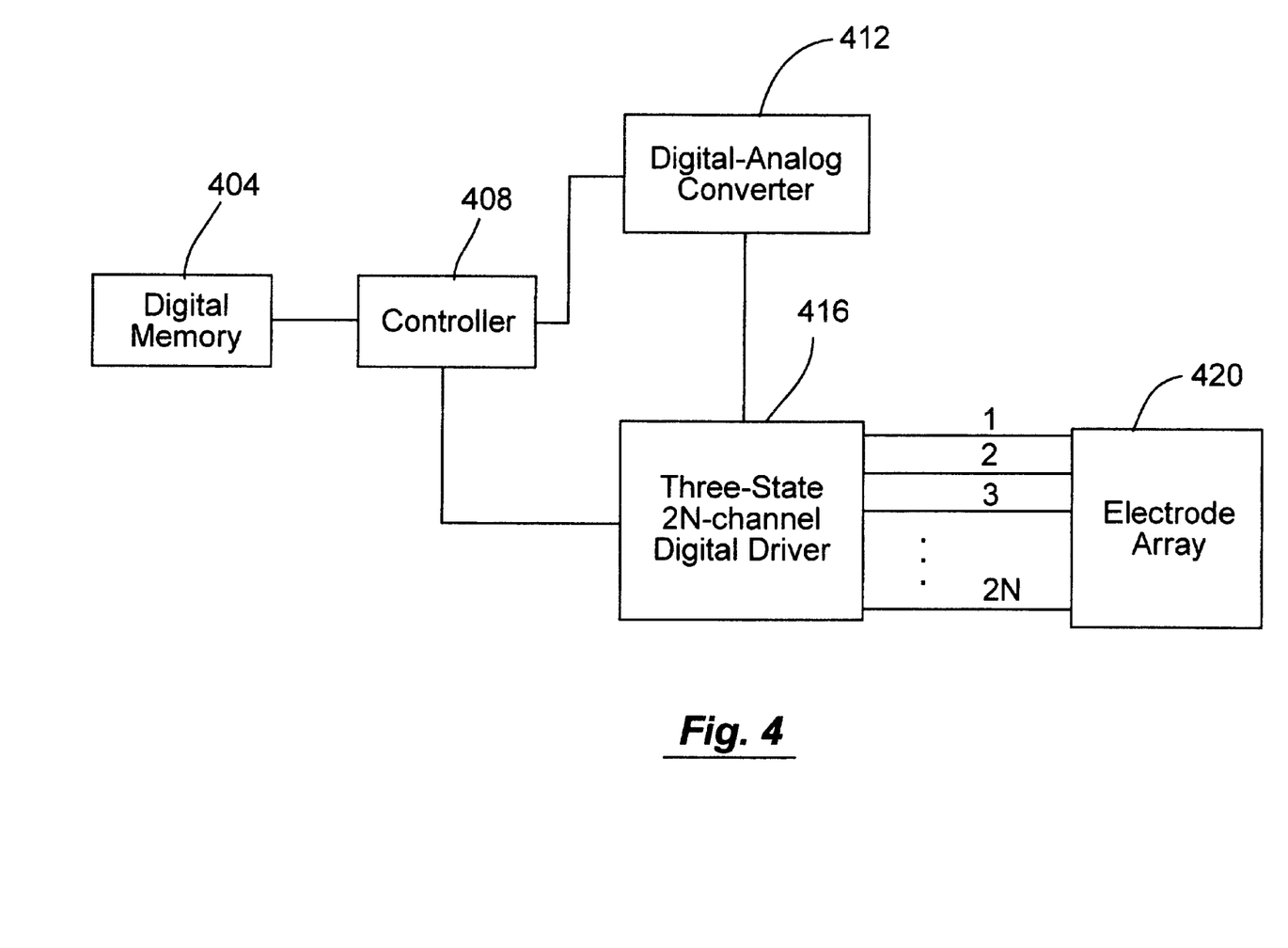
FIG. 4 is a schematic diagram showing the interconnection of various components in one embodiment.
Figure 5:
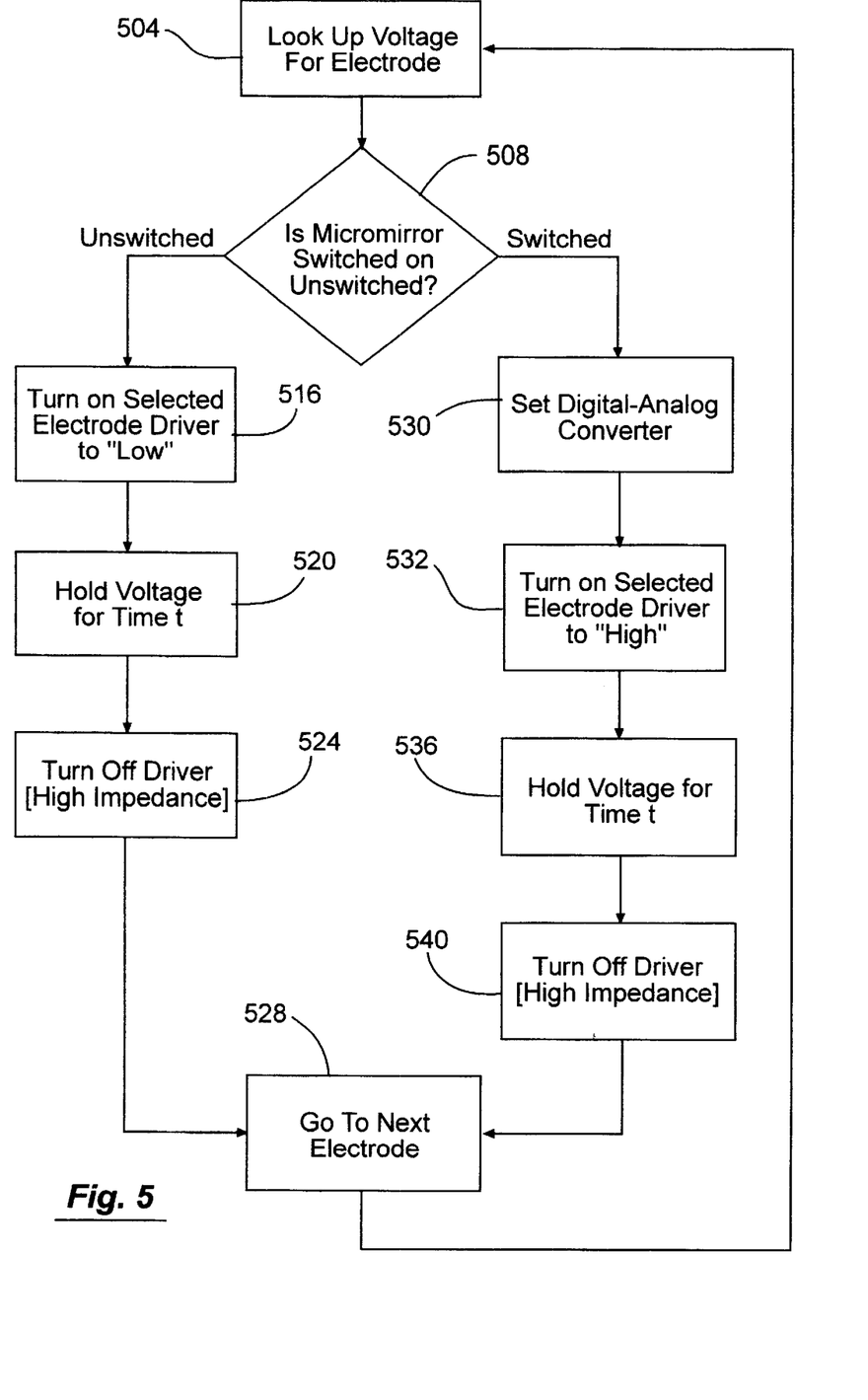
FIG. 5 is a flow diagram showing steps used in one embodiment to provide tilt angles individually to an array of micromirrors.

One embodiment is illustrated in FIGS. 4 and 5. FIG. 4 shows schematically how components of such a system may be interconnected and FIG. 5 illustrates the steps used by those components to maintain the appropriate tilts. The system includes a controller 408 that is in communication with a digital memory 404, a digital-analog converter 412, and a multichannel digital driver 416. In one embodiment, the digital memory may comprise an (electrically) erasable programmable read-only memory (EPROM or EEPROM). In one embodiment, the digital driver 416 is a three-state driver capable of handling at least 2N channels. The digital driver 416 is connected with the electrode array 420 so that each electrode is configured for communication with a separate channel. The digital-analog converter 412 may be configured to have a narrow adjust range with an adder high-voltage offset.

As outlined in FIG. 5, the system functions with a continuous cycle. The voltages used to define the position of each micromirror for a desired configuration are stored in the digital memory 404. For each electrode, the cycle begins with the controller 408 looking up the voltage for that electrode from the digital memory 404 at step 504. A determination is made at step 508 whether the particular micromirror is a switched or unswitched micromirror. The three-state driver is used by assigning a "high" state for a switched mirror and a "low" state for an unswitched mirror. When a particular mirror is not being addressed by the driver, that channel of the driver is put back into high-impedance mode.

Thus, if it is determined at step 508 that the micromirror is switched, the right branch of the figure is followed. The controller 408 sets the digital-analog converter 412 at step 530 in accordance with the voltage for the switched mirror. At step 532, the controller 408 causes the digital driver 416 to use the analog signal provided by the digital-analog converter to turn on the selected electrode driver to the "high" state. Where the digital driver 416 is a three-state driver, this may occur by taking one channel out of three-state, connecting it to the signal from the digital-analog converter 412, setting the voltage on that channel, and putting that channel back into three-state. The voltage is then held on the electrode for time t at step 536. The time t is preferably short but still sufficiently long to ensure that the micromirror is maintained in the unswitched state. Typically a time on an order less than milliseconds is appropriate. The driver is turned off at step 540 and put back into high-impedance mode.

If, instead, it is determined at step 508 that the micromirror is unswitched, the left branch of the figure is followed. At step 516, the controller 408 causes the selected electrode driver to the "low" state. The voltage is then held for time t at step 520. At step 524, the driver is turned off and put back into high-impedance mode.

At step 528, the controller progresses to the next electrode and repeats the same process. In this way, voltages are continually being applied to electrodes to ensure that the entire array of micromirrors is maintained in the desired configuration, even where the tilt for each individual micromirror is defined independently. In alternative embodiments, rather than actuate only a single electrode simultaneously, the system may be configured to activate a set of electrodes, such as electrode pairs or electrode triplets, simultaneously. In one such embodiment, each of the electrodes actuated simultaneously is actuated with the same voltage.

4. Fiber-Optics Implementations a. Wavelength Router

Arrays of tilting micromirrors according to the embodiments described above, and their equivalents, may be used in numerous applications as parts of optical switches, display devices, or signal modulators, among others. One particular application of such tilting micromirror arrays is as a system of optical switches in a wavelength router such as may be used in fiber-optic telecommunications systems. One such wavelength router is described in detail in the copending, commonly assigned U.S. patent application, filed Nov. 16, 1999 and assigned Ser. No. 09/442,061, now U.S. Pat. No. 6,501,877, entitled "Wavelength Router," which is herein incorporated by reference in its entirety, including the Appendix, for all purposes. The embodiments described above may be used in that wavelength router or may be incorporated into other wavelength routers to be used with an array of optical switches where it is desirable to avoid stiction problems and/or have individually defined tilt angles for the micromirrors.

Fiber optic telecommunications systems are currently deploying a relatively new technology called dense wavelength division multiplexing (DWDM) to expand the capacity of new and existing optical fiber systems to help satisfy the steadily increasing global demand for bandwidth. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are performed with a wavelength router used with the current invention by an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

Wavelength routing functions may be performed optically with a free-space optical train disposed between the input ports and the output ports, and a routing mechanism. The free-space optical train can include air-spaced elements or can be of generally monolithic construction. The optical train includes a dispersive element such as a diffraction grating, and is configured so that the light from the input port encounters the dispersive element twice before reaching any of the output ports. The routing mechanism includes one or more routing elements and cooperates with the other elements in the optical train to provide optical paths that couple desired subsets of the spectral bands to desired output ports. The routing elements are disposed to intercept the different spectral bands after they have been spatially separated by their first encounter with the dispersive element.

Figure 6A:
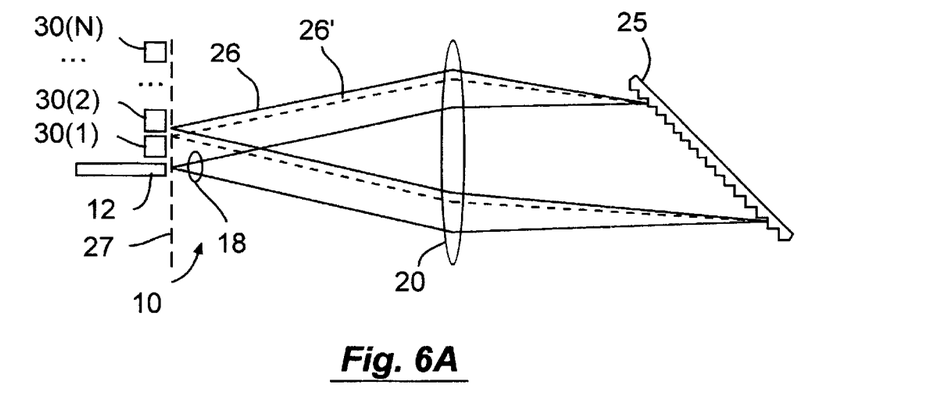
FIGS. 6A, 6B, and 6C are schematic top, side, and end views, respectively, of one embodiment of a wavelength router that uses spherical focusing elements.
Figure 6B:
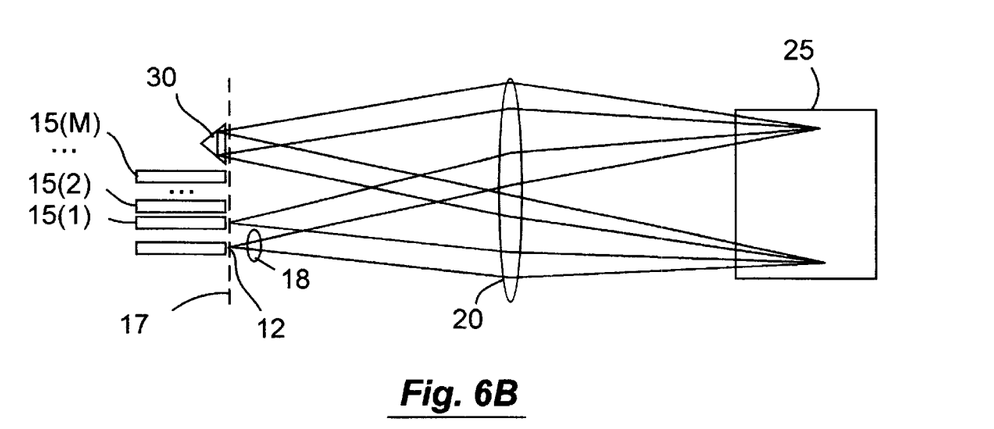
Figure 6C:
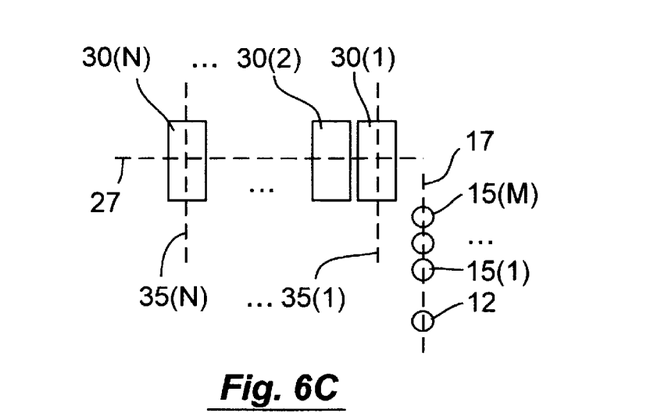

FIGS. 6A, 6B, and 6C are schematic top, side, and end views, respectively, of one embodiment of a wavelength router 10. Its general functionality is to accept light having a plurality N of spectral bands at an input port 12, and to direct subsets of the spectral bands to desired ones of a plurality M of output ports, designated 15(1) ... 15(M). The output ports are shown in the end view of FIG. 6C as disposed along a line 17 that extends generally perpendicular to the top view of FIG. 6A. Light entering the wavelength router 10 from input port 12 forms a diverging beam 18, which includes the different spectral bands. Beam 18 encounters a lens 20 that collimates the light and directs it to a reflective diffraction grating 25. The grating 25 disperses the light so that collimated beams at different wavelengths are directed at different angles back towards the lens 20.

Two such beams are shown explicitly and denoted 26 and 26', the latter drawn in dashed lines. Since these collimated beams encounter the lens 20 at different angles, they are focused towards different points along a line 27 in a transverse plane extending in the plane of the top view of FIG. 6A. The focused beams encounter respective ones of a plurality of retroreflectors that may be configured according as contactless micromirror optical switches as described above, designated 30(1) ... 30(N), located near the transverse plane. The beams are directed back, as diverging beams, to the lens 20 where they are collimated, and directed again to the grating 25. On the second encounter with the grating 25, the angular separation between the different beams is removed and they are directed back to the lens 20, which focuses them. The retroreflectors 30 may be configured to send their intercepted beams along a reverse path displaced along respective lines 35(1) . . . 35(N) that extend generally parallel to line 17 in the plane of the side view of FIG. 6B and the end view of FIG. 2C, thereby directing each beam to one or another of output ports 15.

Figure 7A:
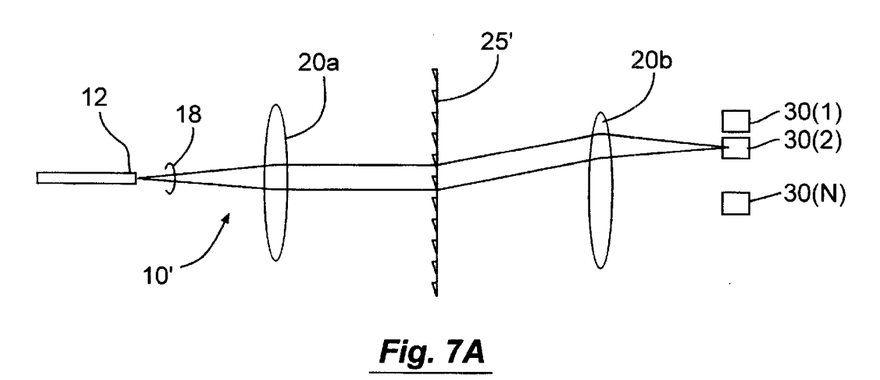
FIGS. 7A and 7B are schematic top and side views, respectively, of a second embodiment of a wavelength router that uses spherical focusing elements.
Figure 7B:
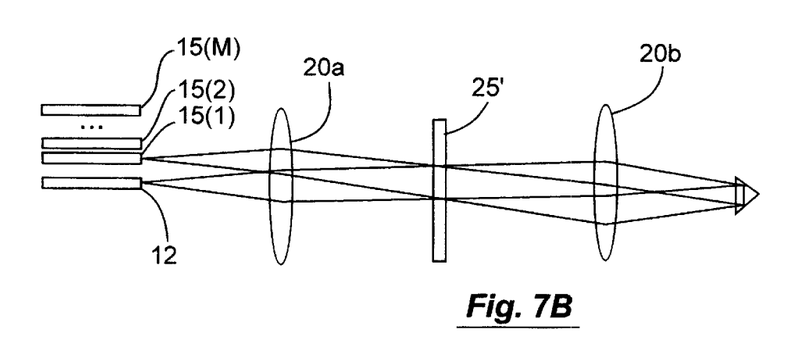

Another embodiment of a wavelength router, designated 10', is illustrated with schematic top and side views in FIGS. 7A and 7B, respectively. This embodiment may be considered an unfolded version of the embodiment of FIGS. 6A–6C. Light entering the wavelength router 10' from input port 12 forms diverging beam 18, which includes the different spectral bands. Beam 18 encounters a first lens 20a, which collimates the light and directs it to a transmissive grating 25'. The grating 25' disperses the light so that collimated beams at different wavelengths encounter a second lens 20b, which focuses the beams. The focused beams are reflected by respective ones of plurality of retroreflectors 30, which may also be configured as contactless micromirror optical switches, back to lens 20b, which collimates them and directs them to grating 25'. On the second encounter, the grating 25' removes the angular separation between the different beams, which are then focused in the plane of output ports 15 by lens 20a.

Figure 8:
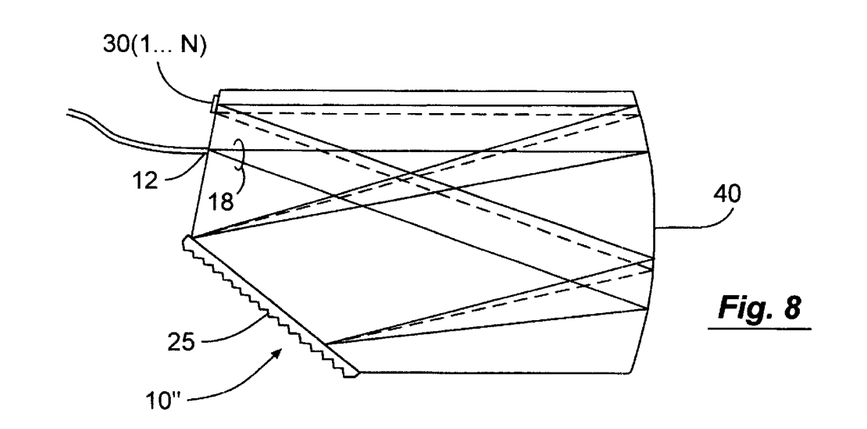
FIG. 8 is a schematic top view of a third embodiment of a wavelength router that uses spherical focusing elements.

A third embodiment of a wavelength router, designated 10", is illustrated with the schematic top view shown in FIG. 8. This embodiment is a further folded version of the embodiment of FIGS. 6A–6C, shown as a solid glass embodiment that uses a concave reflector 40 in place of lens 20 of FIGS. 6A–6C or lenses 20a and 20b of FIGS. 7A–7B. Light entering the wavelength router 10" from input port 12 forms diverging beam 18, which includes the different spectral bands. Beam 18 encounters concave reflector 40, which collimates the light and directs it to reflective diffraction grating 25, where it is dispersed so that collimated beams at different wavelengths are directed at different angles back towards concave reflector 40. Two such beams are shown explicitly, one in solid lines and one in dashed lines. The beams then encounter retroreflectors 30 and proceed on a return path, encountering concave reflector 40, reflective grating 25', and concave reflector 40, the final encounter with which focuses the beams to the desired output ports. Again, the retroreflectors 30 may be configured as contactless micromirror optical switches.

b. Adjustable-Angle Micromirror-Array Retroreflector Implementations

Figure 9A:
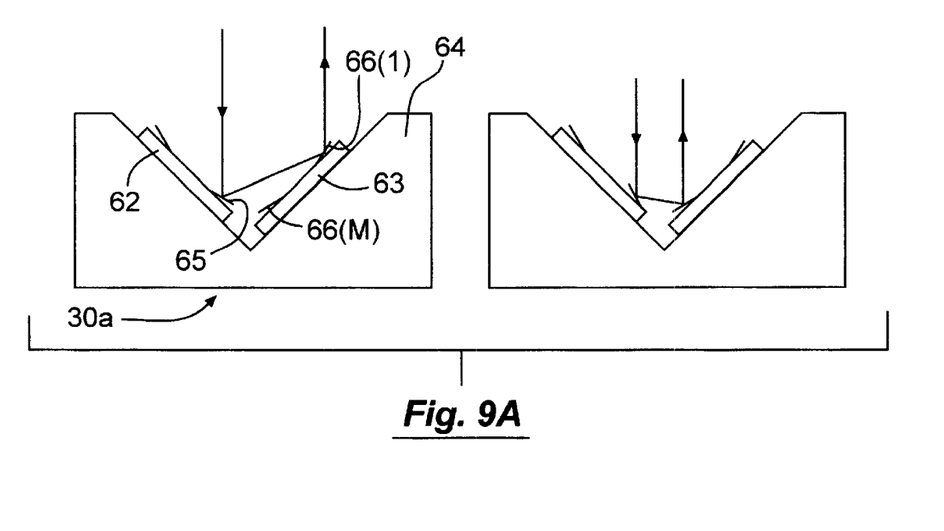
FIGS. 9A and 9B are side and top views of an implementation of a micromirror retroreflector array.
Figure 9B:
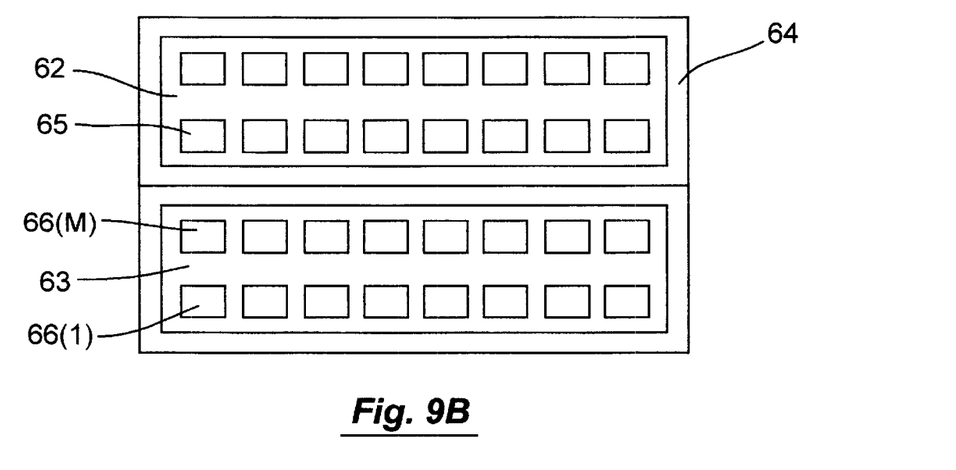

FIG. 9A shows schematically the operation of a retroreflector, designated 30a, that uses individually adjustable micromirrors. FIG. 9B is a top view. A pair of micromirror arrays 62 and 63 is mounted to the sloped faces of a V-block 64. A single micromirror 65 in micromirror array 62 and a row of micromirrors 66(1 . . . M) in micromirror array 63 define a single retroreflector. Micromirror arrays may conveniently be referred to as the input and output micromirror arrays, with the understanding that light paths are reversible. The left portion of the figure shows micromirror 65 in a first orientation so as to direct the incoming beam to micromirror 66(1), which is oriented 90° with respect to micromirror 65's first orientation to direct the beam back in a direction opposite to the incident direction. The right half of the figure shows micromirror 65 in a second orientation so as to direct the incident beam to micromirror 66(M). Thus, micromirror 65 is moved to select the output position of the beam, while micromirrors 66(1 . . . M) are fixed during normal operation. Micromirror 65 and the row of micromirrors 66 (1 . . . M) can be replicated and displaced in a direction perpendicular to the plane of the figure. While micromirror array 62 need only be one-dimensional, it may be convenient to provide additional micromirrors to provide additional flexibility.

In one embodiment, the micromirror arrays are planar and the V-groove has a dihedral angle of approximately 90° so that the two micromirror arrays face each other at 90°. This angle may be varied for a variety of purposes by a considerable amount, but an angle of 90° facilitates routing the incident beam with relatively small angular displacements of the micromirrors. In certain embodiments, the input micromirror array has at least as many rows of micromirrors as there are input ports (if there are more than one), and as many columns of mirrors as there are wavelengths that are to be selectably directed toward the output micromirror array. Similarly, in some embodiments, the output micromirror array has at least as many rows of micromirrors as there are output ports, and as many columns of mirrors as there are wavelengths that are to be selectably directed to the output ports.

In a system with a magnification factor of one-to-one, the rows of micromirrors in the input array are parallel to each other and the component of the spacing from each other along an axis transverse to the incident beam corresponds to the spacing of the input ports. Similarly, the rows of micromirrors in the output array are parallel to each other and spaced from each other (transversely) by a spacing corresponding to that between the output ports. In a system with a different magnification, the spacing between the rows of mirrors would be adjusted accordingly.

5. Exemplary Applications

The aspect of the invention that permits the tilts of each micromirror to be addressed individually allows the system to used for a variety of applications, some of which are set forth explicitly below and others of which will be evident to those of skill in the art after reading these descriptions.

First, as noted above, the system may mitigate or eliminate stiction problems by maintaining the micromirror structures in positions so that the structural films of the micromirrors never come into contact with the substrate or a hard stop.

Second, embodiments of the invention permit an improvement in dual-level MEMS switching. With the separation-voltage behavior illustrated in FIG. 2, dual-level switching configurations use two operational voltages. A first, higher, voltage $V_s$ is used to perform switching of the micromirror from one tilt position to another. A second, lower, voltage $V_h$ is used to maintain the position of the micromirror. With prior-art systems that lack individual addressability of the micromirrors, the voltage level for every mirror is affected whenever a single micromirror is to be switched. This may cause a glitch in the unswitched micromirrors, resulting in, for example, a perturbation in the optical beam for wavelength-router implementations. According to embodiments of the invention, only the voltage of the micromirror to be switched is changed from the hold voltage to the switching voltage. This prevents other mirrors in the array from being affected by the switching so that performance is improved for optical implementations, including wavelength-router implementations.

Third, embodiments of the invention permit the use of an individually addressable resonant-mode driver. In such embodiments, rather than use a higher switching voltage $V_s$ to effect switching of a micromirror, the hold voltage $V_h$ is repeatedly switched on and off for the particular micromirror at or near its natural resonant frequency $\omega_0$. Thus, while all other micromirrors in the array are held with $V_h$, a square wave with amplitude $V_h$ and period $\omega_0/2\pi$ is applied to the micromirror being switched. The use of such a resonant-mode driver is precluded by prior-art implementations that do not allow individual addressing of each micromirror since talking to multiple micromirrors would cause disruption to the optical performance of the array.

Fourth, the micromirrors may use a design with reduced voltage sensitivity. In prior-art configurations in which the micromirror is tilted into a position and stopped by a hard stop, its position is very sensitive to voltage. According to embodiments of the invention, a mechanical stop may be used to limit the torsion spring mode at an angle below the micromirror's design point. Then, a micromirror may be individually addressed to use a secondary bending spring mode for an adjustment of the angle using changes in voltage.

Fifth, embodiments of the invention permit tolerances in optical systems to be made much stricter. Reliance on global addressing requires that tolerances on micromirror angles be relatively large because of practical limitations in setting the micromirror angles. By permitting individual addressing, the tolerances may be made much smaller. For example, in wavelength-router implementations, for each wavelength of the various DWDM channels, the response can be adjusted individually. Thus, for example, where the different wavelength signals have differing strengths, they may be equalized dynamically by choosing micromirror tilt angles that compensate for the different signal strengths by setting the gain for each channel.

Sixth, related to this example is the ability for embodiments of the invention to accommodate changes in external conditions, such as temperature and pressure. Changes in such external conditions can change the optical characteristics of devices that use micromirror arrays, such as wavelength routers. The ability to address each of the micromirrors individually means that the array may be configured specifically for stable performance, even if that performance is less than the optimal performance that could be achieved for idealized unvarying external conditions. Once configured for stable performance, corrections can readily be made to respond to changes in temperature, pressure, and other external conditions. If the optical performance is altered as a result of such changes, the micromirror angles are readjusted to achieve the stable output.

Seventh, embodiments of the invention permit correction of wavelength roll-off. During operation of a wavelength router, for example, it is common for the response of some wavelengths to be better or worse than the response from other wavelengths. For example, over a given wavelength range the signal strength may be weakest at the lowest and largest wavelengths but may be strongest at intermediate wavelengths. Through adjustment of the micromirror tilt angles, the signal strengths can be substantially equalized over the entire wavelength range.

Eighth, embodiments of the invention permit the implementation of wavelength-tunable filters. Such implementation is similar to the correction of wavelength roll-off, except that the variance in wavelength is introduced upstream of the wavelength router or other optical apparatus. Variation in signal strength for different wavelengths as a result of such external differences may be compensated for by individually adjusting micromirrors associated with each of the wavelengths.

Ninth, embodiments of the invention permit the channel gain for an optical device that uses the micromirror array to be matched after final assembly. Generally, fabrication of an optical assembly, such as a wavelength router, includes adjusting the micromirror positions as part of the assembly, and then sealing the device, such as with epoxy or other means. Sealing the device and other final-assembly steps may result in a shift of some components. Compensation for this shift is introduced by examining the performance of the assembled device and using the individual addressing capability to adjust the micromirror positions.

Tenth, the individual addressing capability also limits the extent of electrical shorting. Optical devices made with micromirror arrays may suffer electrical shorts as a result of debris contacting the structure or from other causes. In prior-art embodiments where voltage is applied globally, the presence of debris may result in a loss of voltage to a large number or all of the micromirrors. With individual voltage addressing, the effect of an electrical short is limited to the affected micromirror. In addition, the detection of where an electrical short occurs is facilitated because only a single or a small number of micromirrors is affected, rather than the entire array.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for operating an array of optical micromirrors, each such optical micromirror including a structural film connected with a substrate by a structural linkage and having at least one electrode configured to tilt the structural film upon application of a voltage, the method comprising:

sequentially actuating electrodes associated with each of a plurality of optical micromirrors within the array by applying a voltage to each such electrode for a fixed time, wherein the voltage for each such electrode is selected to position the associated optical micromirror in a certain tilted position; and repeating the step of sequentially actuating electrodes to maintain the tilted positions of the plurality of optical micromirrors.

2. The method recited in claim 1 wherein the voltage selected for each electrode is less than a snap-in voltage for its associated optical micromirror.

3. The method recited in claim 2 wherein at least one of the plurality of optical micromirrors comprises a torsion-beam micromirror.

4. The method recited in claim 2 wherein at least one of the plurality of optical micromirrors comprises a cantilever micromirror.

5. The method recited in claim 1 wherein at least one of the plurality of optical micromirrors includes:

a first actuator linkage connected with the structural film on a first side of the structural linkage and connected with a first linear actuator on a second side of the structural linkage;

a second actuator linkage connected with the structural film on the second side of the structural linkage and connected with a second linear actuator on the first side of the structural linkage;

a first electrode configured to move the first linear actuator upon actuation; and a second electrode configured to move the second linear actuator upon actuation.

6. The method recited in claim 1 wherein at least one of the plurality of optical micromirrors includes a hard stop formed over the substrate at a position closer to the structural linkage than the at least one electrode.

7. The method recited in claim 1 wherein the voltage applied to a first electrode differs from the voltage applied to a second electrode.

8. The method recited in claim 1 wherein the fixed time the voltage is applied to a first electrode differs from the fixed time the voltage is applied to a second electrode.

9. The method recited in claim 1 further comprising retrieving the voltage to be applied to each electrode from a memory.

10. The method recited in claim 9 further comprising changing the voltage to be applied to at least one of the electrodes in the memory.

11. The method recited in claim 10 wherein changing the voltage results in at least one of the micromirrors being switched.

12. The method recited in claim 10 wherein changing the voltage is performed in response to a change in an external condition.

13. The method recited in claim 1 further comprising switching the tilted position of at least one of the plurality of optical micromirrors by changing the voltage applied to the electrode associated with such at least one of the plurality of optical micromirrors.

14. The method recited in claim 1 further comprising switching the tilted position of at least one of the plurality of optical micromirrors by resonantly driving the electrode associated with such at least one of the plurality of optical micromirrors.

15. The method recited in claim 1 wherein the array forms part of a wavelength router for directing a plurality of spectral bands to a plurality of output ports.

16. The method recited in claim 15 wherein the tilted positions of the plurality of optical micromirrors approximately equalize the intensity of the plurality of spectral bands at the plurality of output ports.

17. A system for operating an array of optical micromirrors, each such optical micromirror including a structural film connected with a substrate by a structural linkage and having at least one electrode configured to tilt the structural film upon application of a voltage, the system comprising:
 a multichannel driver having a plurality of lines in communication with electrodes associated with a plurality of optical micromirrors within the array and configured to apply a voltage to such electrodes; and
 a controller in communication with the multichannel driver and configured to control the multichannel driver to maintain the plurality of optical micromirrors in a set of certain tilted positions by sequentially actuating the electrodes by applying the voltage for each such electrode for a fixed time, wherein the voltage for each such electrode is selected to maintain the position of the associated optical micromirror in its tilted position.

18. The system recited in claim 17 wherein the voltage selected for each electrode is less than a snap-in voltage for its associated optical micromirror.

19. The system recited in claim 18 wherein at least one of the plurality of optical micromirrors comprises a torsion-beam micromirror.

20. The system recited in claim 18 wherein at least one of the plurality of optical micromirrors comprises a cantilever micromirror.

21. The system recited in claim 17 wherein at least one of the plurality of micromirrors includes:
 a first actuator linkage connected with the structural film on a first side of the structural linkage and connected with a first linear actuator on a second side of the structural linkage;
 a second actuator linkage connected with the structural film on the second side of the structural linkage and connected with a second linear actuator on the first side of the structural linkage;
 a first electrode configured to move the first linear actuator upon actuation; and
 a second electrode configured to move the second linear actuator upon actuation.

22. The system recited in claim 17 further comprising a memory in communication with the controller and configured to store voltage values for the voltage to be applied to each of the electrodes.

23. The system recited in claim 22 wherein a first voltage value stored in the memory differs from a second voltage value stored in the memory.

24. The system recited in claim 22 wherein the memory is further configured to store time values for the fixed time the voltage is to be applied to each of the electrodes.

25. The system recited in claim 24 wherein a first time value stored in the memory differs from a second time value stored in the memory.

26. The system recited in claim 22 wherein the memory is a digital memory, the system further comprising a digital-analog converter in communication with the controller and the multichannel driver.

27. The system recited in claim 17 wherein the array forms part of a wavelength router for directing a plurality of spectral bands to a plurality of output ports.

28. The system recited in claim 27 wherein the tilted positions of the plurality of optical micromirrors approximately equalize the intensity of the plurality of spectral bands at the plurality of output ports.

29. A system for operating an array of optical micromirrors, each such optical micromirror including a structural film connected with a substrate by a structural linkage and having at least one electrode configured to tilt the structural film upon application of a voltage, the system comprising:
 means for applying a voltage to each of a plurality electrodes associated with a plurality of optical micromirrors within the array; and
 means for controlling the means for applying a voltage to maintain the plurality of optical micromirrors in certain tilted positions by sequentially applying the voltage for each such electrode for a fixed time, wherein the voltage for each such electrode is selected to maintain the position of the associated optical micromirror in its tilted position.

30. The system recited in claim 29 further comprising memory means to store voltage values for the voltage to be applied to each of the electrodes.

31. The system recited in claim 29 wherein the array forms part of a wavelength router means for directing a plurality of spectral bands to a plurality of output ports.

32. The system recited in claim 31 wherein the titled positions of the plurality of optical micromirrors approximately equalize the intensity of the plurality of spectral bands at the plurality of output ports.

33. A wavelength router system for receiving, at an input port, light having a plurality of spectral bands and directing subsets of the spectral bands to respective ones of a plurality of output ports, the wavelength router system comprising:
 a free-space optical train disposed between the input ports and output ports providing optical paths for routing the spectral bands, the optical train including a dispersive element disposed to intercept light traveling from the input port;

a routing mechanism having an array of optical micromirrors, each such optical micromirror including a structural film connected with a substrate by a structural linkage and having at least one electrode configured to tilt the structural film upon application of a voltage;

a multichannel driver having a plurality of lines in communication with electrodes associated with a plurality of optical micromirrors within the array and configured to apply a voltage to such electrodes; and a controller in communication with the multichannel driver and configured to control the multichannel driver to maintain the plurality of optical micromirrors in a set of certain tilted positions by sequentially actuating the electrodes by applying the voltage for each such electrode for a fixed time, wherein the voltage for each such electrode is selected to maintain the position of the associated optical micromirror in its tilted position.

34. The wavelength router system recited in claim 33 wherein the set of certain tilted positions is configured to approximately equalize the intensity of the subsets of the spectral bands at the respective ones of the plurality of output ports.

35. The wavelength router system recited in claim 33 further comprising a memory in communication with the controller and configured to store voltage values for the voltage to be applied to each of the electrodes.

* * * * *